(12) United States Patent
Ahn et al.

(10) Patent No.: US 11,422,766 B2
(45) Date of Patent: Aug. 23, 2022

(54) DISPLAY APPARATUS AND METHOD FOR CONTROLLING THEREOF

(71) Applicant: SAMSUNG ELECTRONICS CO., LTD., Suwon-si (KR)

(72) Inventors: Deukgeun Ahn, Suwon-si (KR); Jaemoon Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/029,377

(22) Filed: Sep. 23, 2020

(65) Prior Publication Data

US 2021/0326092 A1    Oct. 21, 2021

(30) Foreign Application Priority Data

Apr. 17, 2020  (KR) .......................... 10-2020-0046997

(51) Int. Cl.
*G06F 3/14* (2006.01)
*G09G 5/14* (2006.01)

(52) U.S. Cl.
CPC ............. *G06F 3/1446* (2013.01); *G09G 5/14* (2013.01); *G09G 2300/026* (2013.01); *G09G 2310/08* (2013.01); *G09G 2370/20* (2013.01)

(58) Field of Classification Search
CPC .......... H04N 21/4122; H04N 21/43072; G06F 3/1446; G09G 5/006; G09G 5/14;
(Continued)

(56) References Cited

U.S. PATENT DOCUMENTS 7,489,323 B2     2/2009  Yang et al.
2006/0145941 A1*  7/2006  Park .................. G06F 3/1446
                                                    345/1.1
(Continued)

FOREIGN PATENT DOCUMENTS

CN    103544916 B    9/2015
JP    60-105005 A    6/1985
(Continued)

OTHER PUBLICATIONS

Communication dated Dec. 9, 2020 by the European Patent Office in counterpart European Patent Application No. 20197524.0.
(Continued)

*Primary Examiner* — Shaheda A Abdin
(74) *Attorney, Agent, or Firm* — Sughrue Mion, PLLC

(57) ABSTRACT

A display apparatus is disclosed. The display apparatus includes at least one display module; a first interface configured to receive a first signal from a first display apparatus; a second interface configured to receive a second signal from a second display apparatus; and a processor configured to: repeatedly execute a first operation for identifying the first signal received through the first interface and a second operation for identifying the second signal received through the second interface, based on the first signal being identified while executing the first operation, display an image on the at least one display module based on the first signal received
(Continued)

through the first interface without executing the second operation, and based on the second signal being identified while executing the second operation, display the image on the at least one display module based on the second signal received through the second interface without executing the first operation.

20 Claims, 11 Drawing Sheets

(58) Field of Classification Search
CPC .......... G09G 2310/08; G09G 2370/20; G09G 2300/026; G09G 2330/08
See application file for complete search history.

(56) References Cited

U.S. PATENT DOCUMENTS

| | | |
|---|---|---|
| 2012/0319926 A1 | 12/2012 | Koebrich et al. |
| 2013/0265261 A1* | 10/2013 | Min .................. G09G 5/006 345/173 |
| 2017/0116927 A1* | 4/2017 | Bae .................. G09G 3/3677 |
| 2018/0024801 A1* | 1/2018 | Chang ................ G06F 13/4081 345/1.3 |
| 2018/0046424 A1 | 2/2018 | Jo et al. |
| 2018/0181252 A1 | 6/2018 | Park et al. |
| 2018/0321893 A1 | 11/2018 | Terao |
| 2020/0264828 A1 | 8/2020 | Kim et al. |

FOREIGN PATENT DOCUMENTS

| | | |
|---|---|---|
| JP | 2016-191771 A | 11/2016 |
| JP | 2017-207580 A | 11/2017 |
| KR | 10-2019-0048424 A | 5/2019 |
| KR | 10-1987186 B1 | 6/2019 |
| KR | 10-2020-0009830 A | 1/2020 |
| KR | 10-2095164 B1 | 3/2020 |
| WO | 03/034396 A1 | 4/2003 |
| WO | 2017/054886 A1 | 4/2017 |
| WO | 2021/085918 A1 | 5/2021 |

OTHER PUBLICATIONS

International Search Report (PCT/ISA/210) dated Jan. 26, 2021 by the International Searching Authority in counterpart International Patent Application No. PCT/KR2020/013908.

Written Opinion (PCT/ISA/237) dated Jan. 26, 2021 by the International Searching Authority in counterpart International Patent Application No. PCT/KR2020/013908.

Communication dated Sep. 6, 2021 issued by the European Patent Office in European Application No. 20197524.0.

* cited by examiner

| 100-1 | 100-2 | 100-3 | 100-4 |
| 100-5 | 100-6 | 100-7 | 100-8 |
| 100-9 | 100-10 | 100-11 | 100-12 |
| 100-13 | 100-14 | 100-15 | 100-16 |

1000

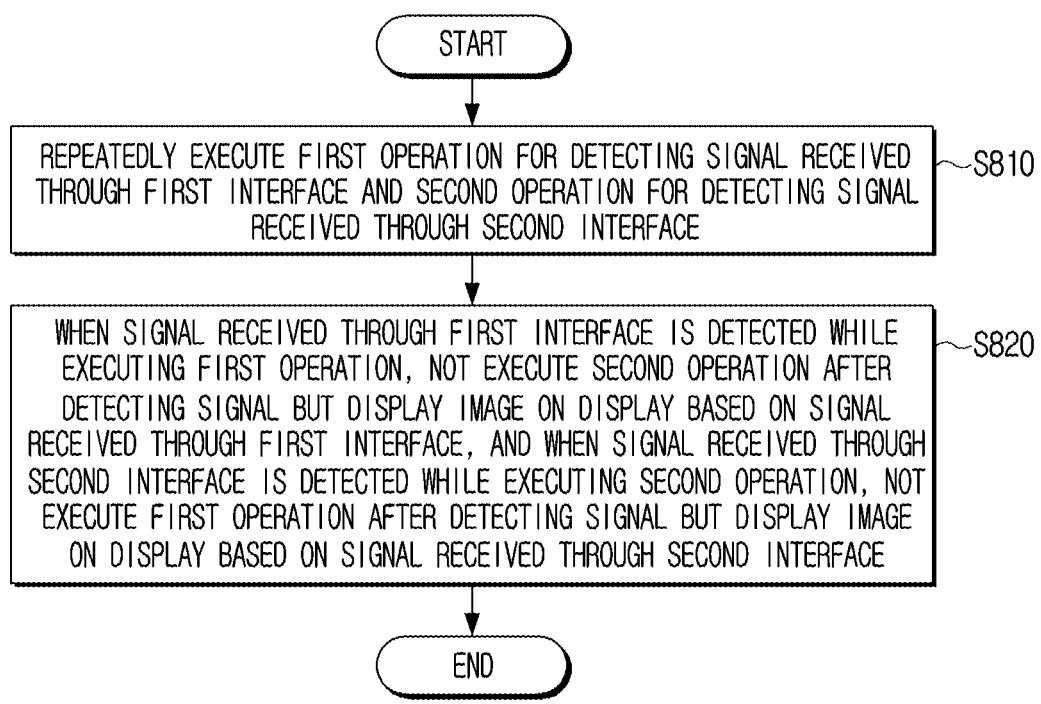

DISPLAY APPARATUS AND METHOD FOR CONTROLLING THEREOF

CROSS-REFERENCE TO RELATED APPLICATION(S)

This application is based on and claims priority under 35 U.S.C. § 119(a) to Korean Patent Application No. 10-2020-0046997, filed on Apr. 17, 2020, in the Korean Intellectual Property Office, the disclosure of which is incorporated by reference herein in its entirety.

BACKGROUND

1. Field

The disclosure relates to a display apparatus and a method for controlling thereof. More particularly, the disclosure relates to a display apparatus constituting a modular display apparatus and a method for controlling thereof.

2. Description of Related Art

A modular display apparatus is a display apparatus in which a plurality of display apparatuses are arranged, and may be driven in concert to provide a large screen.

The plurality of display apparatuses constituting the modular display apparatus are connected in a wired or wireless method to transmit and receive image signals. The plurality of display apparatuses may be connected in a daisy-chain.

However, when the display apparatus transmits and receives a plurality of image signals, signal interference may occur between the plurality of image signals. In addition, a fever phenomenon may occur in the interface while transmitting and receiving the plurality of image signals.

SUMMARY

In accordance with an aspect of the disclosure, a display apparatus, of a modular display apparatus, includes: at least one display module; a first interface configured to receive a first signal from a first display apparatus; a second interface configured to receive a second signal from a second display apparatus; and a processor configured to: repeatedly execute a first operation for identifying the first signal received through the first interface and a second operation for identifying the second signal received through the second interface, based on the first signal being identified while executing the first operation, display an image on the at least one display module based on the first signal received through the first interface without executing the second operation, and based on the second signal being identified while executing the second operation, display the image on the at least one display module based on the second signal received through the second interface without executing the first operation.

The display apparatus may further include: a third interface configured to transmit the second signal to the first display apparatus; and a fourth interface configured to transmit the first signal to the second display apparatus. The processor may be further configured to: based on the first signal received through the first interface being identified while executing the first operation, transmit the first signal received through the first interface to the second display apparatus through the fourth interface, and based on the second signal received through the second interface being identified while executing the second operation, transmit the second signal received through the second interface to the first display apparatus through the third interface.

The first signal received through the first interface and the second signal received through the second interface may include information indicating a common image.

The first signal received through the first interface may be transmitted to a first plurality of display apparatuses among a plurality of display apparatuses constituting the modular display apparatus through a first path, the second signal received through the second interface may be transmitted to a second plurality of display apparatuses among the plurality of display apparatuses constituting the modular display apparatus through a second path, and the first plurality of display apparatuses and the second plurality of display apparatuses may not include a common display apparatus.

The processor may be further configured to: based on a phase locked loop (PLL) being locked as a clock signal is received by the first interface, display the image on the display based on the first signal received through the first interface without executing the second operation, and based on the PLL not being locked as the clock signal is not received by the first interface, execute the second operation.

The processor may be further configured to: identify whether a clock signal is included in the first signal received through the first interface while executing the first operation, based on the clock signal being included in the first signal, display the image on the display based on the first signal received through the first interface without executing the second operation, and based on the clock signal being not included in the first signal, execute the second operation.

The processor may be further configured to: identify whether the first signal includes a sync signal and a data enable signal, based on the sync signal and the data enable signal being identified in the first signal, display the image on the display based on the first signal received through the first interface without executing the second operation, and based on either one or any combination of the sync signal and the data enable signal not being identified in the first signal, execute the second operation.

The processor may be further configured to not execute the second operation while executing the first operation, and to not execute the first operation while executing the second operation.

The processor may be further configured to execute the first operation during a first period, and based on the first signal not being identified in the first period, execute the second operation during a second period after the first period.

In accordance with an aspect of the disclosure, a method of controlling a display apparatus of a modular display apparatus, includes: repeatedly executing a first operation for identifying a first signal received through a first interface from a first display apparatus, and a second operation for identifying a second signal received through a second interface from a second display apparatus; based on the first signal received through the first interface being identified while executing the first operation, displaying an image based on the first signal received through the first interface without executing the second operation; and based on the second signal received through the second interface being identified while executing the second operation, displaying the image based on the second signal received through the second interface without executing the first operation.

The method may further include: based on the first signal being received through the first interface while executing the first operation, transmitting the first signal received through the first interface to the second display apparatus through a fourth interface, and based on the second signal being received through the second interface while executing the second operation, transmitting the second signal received through the second interface to the first display apparatus through a third interface.

The first signal received through the first interface and the second signal received through the second interface may include information indicating a common image.

The first signal received through the first interface may be transmitted to a first plurality of display apparatuses among a plurality of display apparatuses constituting the modular display apparatus through a first path, the second signal received through the second interface may be transmitted to a second plurality of display apparatuses among the plurality of display apparatuses constituting the modular display apparatus through a second path, and the first plurality of display apparatuses and the second plurality of display apparatuses may not include a common display apparatus.

The method may further include: based on a phase locked loop (PLL) being locked as a clock signal received by the first interface, displaying the image on the display based on the first signal received through the first interface without executing the second operation, and based on the PLL not being locked as the clock signal is not received by the first interface, executing the second operation.

The method may further include: identifying whether a clock signal is included in the first signal received through the first interface while executing the first operation, based on the clock signal being included in the first signal, displaying the image on the display based on the first signal received through the first interface without executing the second operation, and based on the clock signal being not included in the first signal, executing the second operation.

The method may further include: identifying whether the first signal includes a sync signal and a data enable signal, based on the sync signal and the data enable signal being identified in the first signal, displaying the image on the display based on the first signal received through the first interface without executing the second operation, and based on any one or any combination of the sync signal and the data enable signal not being identified in the first signal, executing the second operation.

The executing may include not executing the second operation while executing the first operation, and not executing the first operation while executing the second operation.

The executing may include executing the first operation during a first period, and based on the first signal not being identified in the first period, executing the second operation during a second period after the first period.

In accordance with an aspect of the disclosure, a display apparatus includes: at least one display module; a first interface; a second interface; and a processor configured to: based on a first signal being received through the first interface, disable the second interface and control the at least one display module to display an image based on the first signal; based on the first signal not being received through the first interface, disable the first interface, activate the second interface and control the at least one display module to display the image based on a second signal received through the second interface.

The processor may be further configured to repeatedly and alternately identify whether the first signal is received at the first interface and whether the second signal is received at the second interface until either the first signal is received at the first interface or the second signal is received at the second interface.

The processor may be further configured to: enable the first interface and disable the second interface while identifying whether the first signal is received at the first interface; and enable the second interface and disable the first interface while identifying whether the second signal is received at the second interface.

The display apparatus may further include: a third interface; and a fourth interface, and the processor may be further configured to: transmit the first signal through the third interface based on the first signal being received through the first interface; and transmit the second signal through the fourth interface based on the second signal being received through the second interface.

The processor may be further configured to: enable the third interface and disable the fourth interface while identifying whether the first signal is received at the first interface; and enable the fourth interface and disable the third interface while identifying whether the second signal is received at the second interface.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1C is a view illustrating a modular display apparatus according to an embodiment;

FIG. 8 is a flowchart illustrating a method of controlling a display apparatus according to an embodiment.

DETAILED DESCRIPTION

Figure 1A:
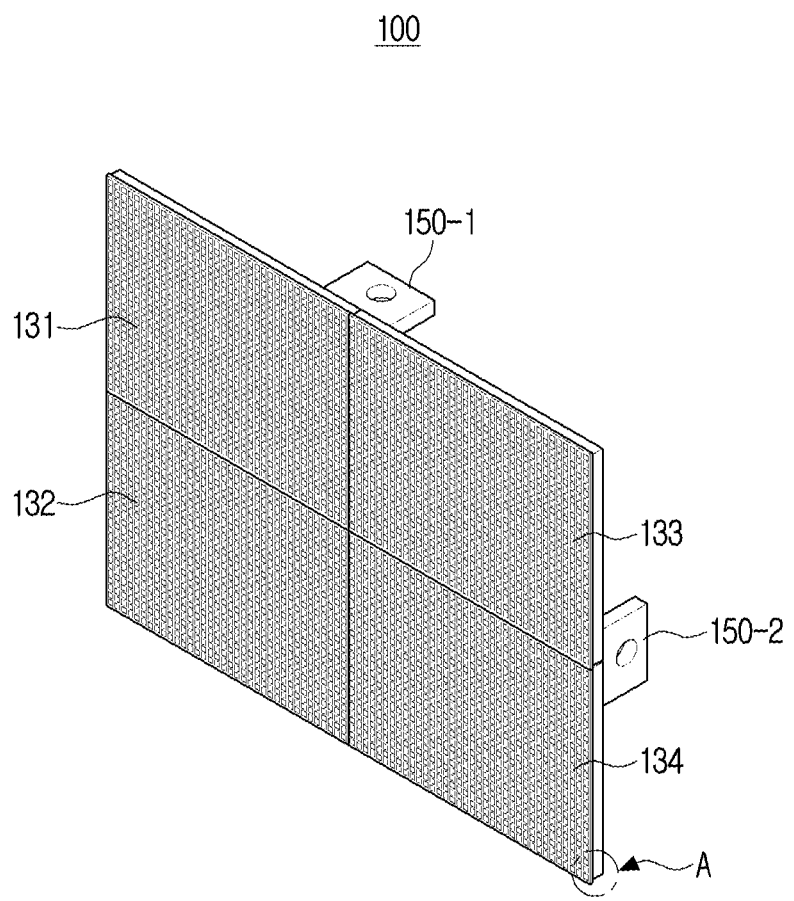
FIG. 1A is a view illustrating a display according to an embodiment.

The terms used in the disclosure and the claims are general terms selected in consideration of the functions of the various embodiments. However, such terms may be varied depending on an intention of those skilled in the art, a legal or technical interpretation, an emergence of a new technology, and the like. Also, there may be some terms arbitrarily selected by an applicant. Such terms may be construed according to meanings defined in the present specification, and may also be construed based on general contents of the present specification and a typical technical concept in the art unless the terms are not specifically defined.

It is to be understood that when one component is referred to as being "on" or "in contact with" another component, it may be in direct contact with or be connected to the another component, or be in contact with or be connected to the another component with other component interposed therebetween. To the contrary, if one component is described as being "directly on" or "in direct contact with" another component, it is to be understood that there is no other component interposed therebetween. Other expressions that describe the relationship between the components, for example, "between" and "directly between" may be interpreted in the same way.

As used herein, terms the terms "1st" or "first" and "second" or "2nd" may use corresponding components regardless of importance or order and are used to distinguish one component from another without limiting the components.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Singular forms are intended to include plural forms unless the context clearly indicates otherwise. It is to be understood that the terms "include", "have" or the like, specify the presence of features, numerals, steps, operations, components, parts or a combination thereof mentioned in the specification, but do not preclude the addition of one or more other features, numerals, steps, operations, components, parts or a combination thereof.

In describing embodiments, detailed description of relevant known functions or components may be omitted if it would obscure the description of the subject matter.

Embodiments will be described in detail with reference to the accompanying drawings and the contents described in the drawings, but the disclosure is not restricted or limited by the embodiments.

Hereinafter, certain embodiments will now be explained in detail with reference to the accompanying drawings.

One or more embodiments provide a display apparatus capable of selectively receiving one of a plurality of image signals and a method of controlling thereof.

Figure 1B:
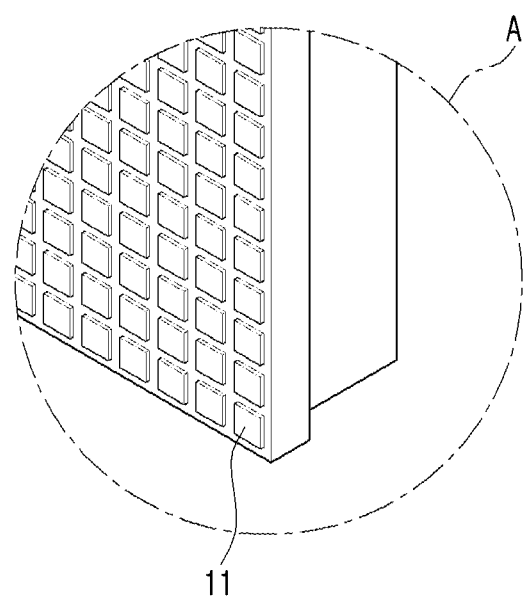
FIG. 1B is a view illustrating a display module according to an embodiment.

FIGS. 1A to 1C are views illustrating a display apparatus according to an embodiment.

The display apparatus 100 according to an embodiment the disclosure may display one or more display modules.

Referring to FIG. 1A, a display apparatus 100 according to an embodiment may include four display modules 131 to 134. The display modules 131 to 134 may be physically coupled to constitute one display.

For example, each of the display modules 131 to 134 may be implemented as an LED display module including an inorganic light emitting diode (LED).

Specifically, referring to FIG. 1B, each of the display modules 131 to 134 may be implemented as an LED display module including a plurality of LEDs 11 that implement sub-pixels. For example, a red LED, a green LED, and a blue LED may form one pixel. In the pixel, the red LED may act as a red subpixel, the green LED may act as a green subpixel and the blue LED may act as a blue subpixel.

The plurality of pixels may be arranged in a matrix form (e.g., M×N, where M and N are natural numbers). For example, the form of the matrix may have the same arrangement (e.g., M=N, where M, N are natural numbers, 16×16 arrangements, 24×24 arrangements, etc.), and also other arrangements (e.g. M≠N, where M and N are natural numbers).

According to an embodiment, each LED of the LED display module may be implemented as a micro LED. The micro LED is an LED having a size of about 5 to 100 micrometers, and refers to an ultra-small light emitting device. For example, each of the micro LEDs may emit light of a corresponding color, and thereby do not require a color filter. For example, a pixel of an LED display module may include a red micro LED that emits red light, a green micro LED that emits green light and a blue micro LED that emits blue light.

According to an embodiment, the LED display module does not include a bezel. For example, the LED display module may be implemented using micro LEDs and not include a bezel. Because the LED display module implemented using micro LEDs does not include a bezel, seamless images may be displayed using a plurality of display apparatuses physically arranged adjacent each other.

However, embodiments are not limited to an LED display module, and the display module may be implemented as a flat panel display panel such as a liquid crystal panel (LCD), an organic LED (OLED), an active-matrix OLED (AMO-LED) panel, a plasma display panel (PDP), etc. Hereinafter, for convenience of description, the display module is described as an LED display module.

Referring back to FIG. 1A, the display apparatus 100 according to an embodiment may be implemented in a form in which a plurality of display modules 131 to 134 are combined in a 2×2 arrangement.

The 2×2 arrangement of LED display modules is only an example, and arrangements and numbers of LED display modules may be variously changed.

The display apparatus 100 may include a base plate on which each of the display modules 131 to 134 may be mounted. The base plate may be implemented in a form that each display module can be mounted on a front of the base plate.

The display apparatus 100 according to an embodiment may include a plurality of coupling portions 150-1 and 150-2 that can be coupled to other display apparatuses. The positions and numbers of the coupling portions of FIG. 1A are only an example, and the location and number of coupling portions may be variously changed.

Accordingly, the display apparatus 100 according to an embodiment may be combined with other display apparatuses to form a modular display apparatus. The modular display apparatus may be referred to as a wall display or a video wall.

For example, referring to FIG. 1C, a plurality of display apparatuses 100-1 to 100-16 may be combined in a 4×4 arrangement according to an embodiment, and be implemented as a modular display apparatus 1000 such as a video wall. Embodiments are not limited to the modular display apparatus having the 4×4 arrangement, and arrangement forms and numbers of the modular display apparatus may be variously changed.

The modular display apparatus 1000 may display an image through a display module included in each of the plurality of display apparatuses. The image may be an image received from an external device (e.g., a set-top box, a computer, a server, etc.), and also an image pre-stored in the modular display apparatus.

Figure 1D:
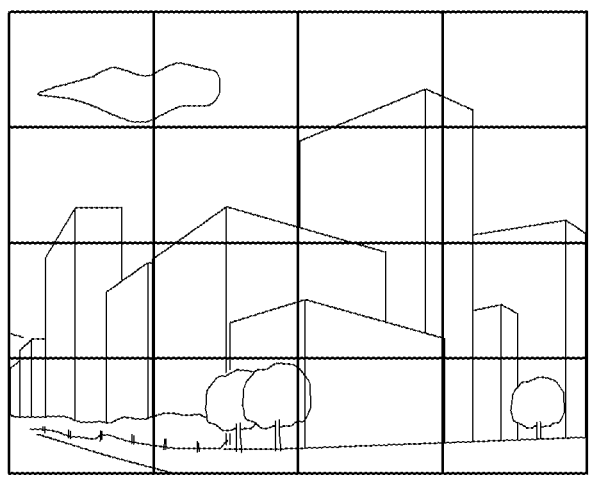
FIG. 1D is a view illustrating an image displayed on a modular display apparatus according to an embodiment.

Specifically, when information on an image is received, each display apparatus 100 constituting the modular display apparatus 1000 may identify a region corresponding to identification information of the display apparatus 100 among an entire region of the image and display an image of the corresponding region based on the identification information of the display apparatus 100. Accordingly, as illustrated in FIG. 1D, the modular display apparatus 1000 according to an embodiment may display an image through a plurality of display apparatuses.

For example, the display apparatus 100 is one of a plurality of display apparatuses constituting the modular display apparatus 1000 and may be referred to as a cabinet.

Figure 2:
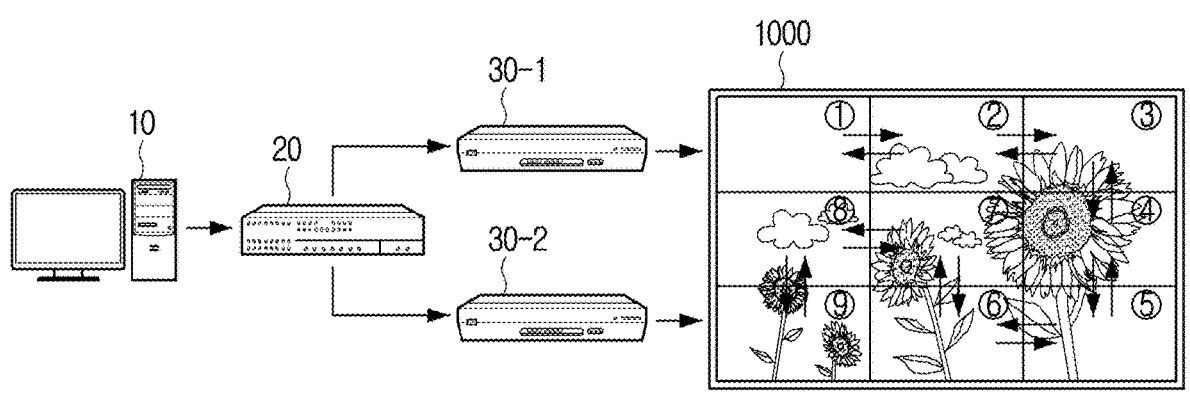
FIG. 2 is a view illustrating a signal transmission system according to an embodiment.

FIG. 2 is a view illustrating a signal transmission system according to an embodiment.

Referring to FIG. 2, a signal transmission system according to an embodiment may include a content transmission device 10, a splitter device 20, a first external device 30-1, a second external device 30-2, and a modular display apparatus 1000.

The content transmission device 10 (e.g., a set-top box, a computer, a server, etc.) may transmit a signal to the splitter device 20. The signal may be an image signal including information on an image, and also a control signal for controlling the modular display apparatus 1000.

The signal received by the splitter device 20 from the content transmission device 10 may be referred to as a first signal. The splitter device 20 may duplicate the first signal to generate a second signal. The second signal may be a signal for execution of a redundancy function. For example, when the first signal received from the content transmission device 10 is an image signal including information on the image, the splitter device 20 may generate a second signal including information on the same image as the image included in the image signal. Then, the splitter device 20 may transmit the signal received from the content transmission device 10 (the first signal) to the first external device 30-1, and transmit a signal generated by replicating the first signal (the second signal) to the second external device 30-2. The first signal may be referred to as a main signal and the second signal may be referred to as a backup signal. For this operation, the splitter device 20 may include a first interface that can be connected to the first external device 30-1 and a second interface that can be connected to the second external device 30-2.

The first external device 30-1 may transmit the first signal received from the splitter device 20 to the modular display apparatus 1000. Specifically, the first external device 30-1 may be connected to a display apparatus of the modular display apparatus 1000 by wire or wireless communication, and transmit the first signal received from the splitter device 20 through the wired or wireless communication method to the modular display apparatus 1000. The display apparatus (e.g., a first display apparatus) that received the first signal may transmit the first signal to another display apparatus adjacent the first display apparatus.

The second external device 30-2 may transmit the second signal received from the splitter device 20 to the modular display apparatus 1000. Specifically, the second external device 30-2 may be connected to a display apparatus of the modular display apparatus 1000 in a wired or wireless communication, and transmit a second signal received from the splitter device 20 to the modular display apparatus 1000 through the wired or wireless communication method. The display apparatus (e.g., a second display apparatus) that received the second signal may transmit the second signal to another display apparatus adjacent the second display apparatus.

Thereafter, when a first signal (main signal) or a second signal (backup signal) is transmitted to each display apparatus constituting the modular display apparatus 1000, the modular display apparatus 1000 may perform various functions based on the first signal or the second signal. For example, when the first and second signals include information on an image, the modular display apparatus 1000 may display an image based on the first signal or the second signal.

In the description above, a signal is replicated by the splitter device 20, and the modular display apparatus 1000 is connected to the first and second external devices 30-1 and 30-2, but this is only an example. According to an embodiment, the modular display apparatus 1000 is connected to one external device, the external device may receive a first signal from the content transmission device 10, replicate the first signal to generate a second signal, transmit the first signal to a first display apparatus of the modular display apparatus 1000, and transmit the second signal to a second display apparatus of the modular display apparatus 1000. In this case, the splitter device 200 may be omitted from the signal transmission system described above.

Each display apparatus constituting the modular display apparatus 1000 according to an embodiment may selectively receive the first signal or the second signal. Hereinafter, this will be described in greater detail below.

Figure 3:
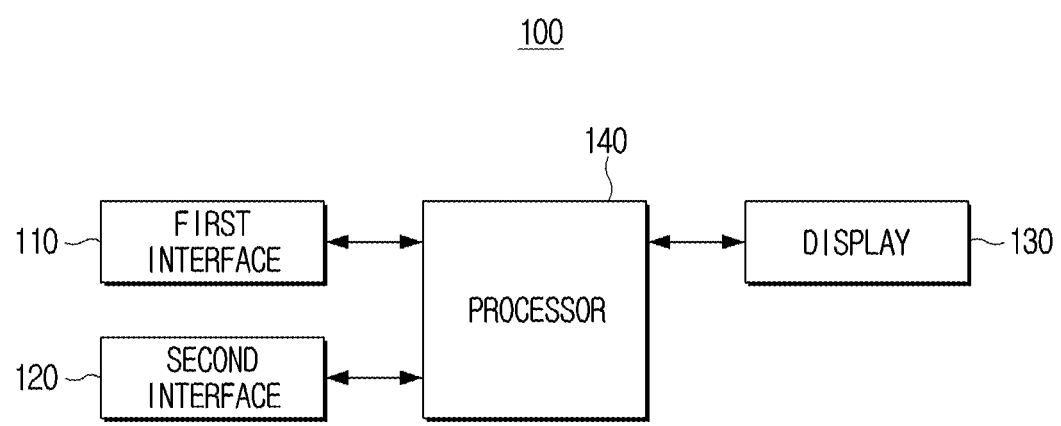
FIG. 3 is a block diagram illustrating a display apparatus according to an embodiment.

FIG. 3 is a block diagram illustrating a display apparatus according to an embodiment. The display apparatus 100 may be one of a plurality of display apparatuses constituting the modular display apparatus.

Referring to FIG. 3, the display apparatus 100 according to an embodiment may include a first interface 110, a second interface 120, a display 130, and a processor 140.

The first interface 110 may receive a first signal from the first external device 30-1 or receive the first signal from the other display apparatus (e.g., the first display apparatus) being connected and adjacent to the display apparatus 100. Specifically, when the first interface 110 is in communications connection with the first external device 30-1, the first interface 110 may receive the first signal from the first external device 30-1, and when the first interface 110 is in communications connection with the first display apparatus, the first interface 110 may receive the first signal from the first display apparatus. The first signal may refer to an image signal including information on the image, and also may be a control signal for controlling the display apparatus 100.

The second interface 120 may receive a second signal from the second external device 30-2 or receive the second signal from the other display apparatus (e.g., the second display apparatus) being connected and adjacent to the display apparatus 100. Specifically, when the second interface 120 is in communications connection with the second external device 30-2, the second interface 120 may receive the second signal from the second external device 30-2, and when the second interface 120 is in communications connection with the second display apparatus, the second interface 120 may receive the second signal from the second display apparatus. The second signal may refer to an image signal including information on the image, and also may be a control signal for controlling the display apparatus 100.

The display 130 may display various images. The image may include a still image and a video, and the display 130 may display various images such as broadcast contents and multimedia contents. In addition, the display 130 may display various user interfaces (UIs) and icons.

The display 130 may display an image of an area corresponding to identification information of the display apparatus 100 among the images included in the image signal. For example, if the identification information of the display apparatus is ID 1, the display 130 may display an image of an area corresponding to ID 1 among the images included in the image signal. In this regard, the display apparatus 100 may store identification information of the display apparatus 100.

The display 130 may be realized as various kinds of displays, such as liquid crystal display (LCD), organic light-emitting diode (OLED), micro LED, liquid crystal on silicon (LCoS), digital light processing (DLP), or the like. Further, the display 130 may include a driver circuit that may be realized as A-Si TFT, low temperature poly silicon (LTPS), TFT, or organic TFT (OTFT) and a backlight unit.

The display 130 may be a touch screen including a touch sensor. The touch sensor may generate a touch signal indicating a touch location.

The processor 140 controls overall operations of the display apparatus 100. The processor 140 may include at least one or more of a central processing unit (CPU), an application processor (AP) and a communication processor (CP). Alternatively, the processor 140 may refer to a field programmable gate array (FPGA) designed or programmed to implement various functions described below.

The processor 140 may, for example, control a number of hardware or software elements connected to the processor 140 by driving an operating system or application program, and perform various data processing and calculations. Further, the processor 140 may load and process a command or data received from at least one of the other components to a volatile memory and store diverse data in a non-volatile memory.

Hereinafter, for convenience of description, the operation of the processor 140 will be described with reference to FIGS. 4 and 5.

Figure 4:
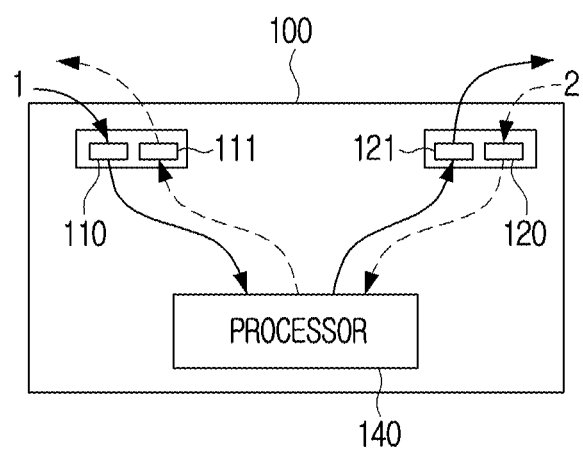
FIG. 4 is a view illustrating a structure of a display apparatus according to an embodiment.

FIG. 4 is a view illustrating a structure of a display apparatus according to an embodiment.

The display apparatus 100 according to an embodiment may include a plurality of interfaces. Specifically, referring to FIG. 4, the display apparatus 100 may include a first interface 110 and a second interface 120. A first signal 1 may be received through the first interface 110 from the first external device 30-1 or the first display apparatus being adjacent and connected to the display apparatus 100, and the received first signal may be transmitted to the processor 140 through the first interface 110. A second signal 2 may be received through the second interface 120 from the second external device 30-2 or the second display apparatus being adjacent and connected to the display apparatus 100.

The display apparatus 100 may also include a third interface 111 and a fourth interface 121. The second signal 2, received from the second external device 30-2 or the second display apparatus, may be transmitted through the third interface 111 to the first display apparatus. The first signal 1, received from the first external device 30-1 or the first display apparatus, may be transmitted to the second display apparatus through the fourth interface 121.

According to an embodiment, the first and third interfaces 110 and 111 may be included in a first port, and the second and fourth interfaces 120 and 121 may be included in a second port. Further, the first port may be connected to the second port of the first display apparatus through a cable, and the second port may be connected to the first port of the second display apparatus through a cable.

The first signal may include information on an image, and the second signal may include information on the same image as the image included in the first signal. For example, the second signal may refer to a signal for executing a redundancy function.

In addition, the first signal may refer to a signal transmitted to a plurality of display apparatuses constituting the modular display apparatus 1000 through a first path (e.g., a forward path). The first path may refer to a path where a signal sequentially passes from the first display apparatus which receives the signal from the first external device 30-1, the plurality of display apparatuses constituting the modular display apparatus 1000 to the nth display apparatus which receives the signal from the second external device 30-2. For example, as illustrated in FIG. 2, when the first to ninth display apparatuses are sequentially connected, the first signal may be sequentially transmitted from the first display apparatus to the ninth display apparatus along the first path.

The second signal may refer to a signal transmitted to a plurality of display apparatuses constituting the modular display apparatus 1000 through a second path (e.g., a backward path). The second path may refer to a path where a signal sequentially passes from the nth display apparatus which receives a signal from the second external device 30-2 and the plurality of display apparatuses constituting the modular display apparatus 1000 to the first display apparatus which receives the signal from the first external device 30-1. For example, as illustrated in FIG. 2, when the first to ninth display apparatuses are sequentially connected, the second signal may be sequentially transmitted from the ninth display apparatus to the first display apparatus along the second path.

As described below, the first signal according to an embodiment may be transmitted to a first plurality of display apparatuses among the plurality of display apparatuses constituting the modular display apparatus 1000 through the first path, and the second signal according to an embodiment may be transmitted to a second plurality of display apparatuses excluding the first plurality of display apparatuses among the plurality of display apparatuses constituting the modular display apparatus 1000 through the second path.

The processor 140 may execute a first operation (i.e., a first logic operation) for identifying (or detecting) the first signal 1 received through the first interface 110 and a second operation (i.e., a second logic operation) for identifying (or detecting) the second signal 2 received through the second interface 120. According to an embodiment, the first signal 1 may refer to a signal transmitted by the first display apparatus being connected and adjacent to the display apparatus 100, and the second signal 2 may be a signal transmitted by the second display apparatus being connected and adjacent to the display apparatus 100.

For example, the processor 140 may repeatedly (or alternately) execute the first and second operations. In other words, the processor 140 may not execute the second operation while executing the first operation, and may not execute the first operation while executing the second operation.

For example, the processor 140 may repeatedly execute the first operation and the second operation based on a predetermined period. In other words, the processor 140 may execute the first operation during the first period based on the predetermined period, and when the first signal 1 is not identified in the first interface 110 during the first period, the processor may execute the second operation during the second period based on the predetermined period. For example, when the predetermined period is 1 second, the processor 140 may execute the first operation for 1 second (from 0 to 1 seconds), and when the first signal 1 is not identified from 0 to 1 seconds, the processor 140 may execute the second operation for 1 second (from 1 to 2 seconds). The period may be determined by a unit of time and also be determined by a unit of frame. In addition, the processor 140 may execute the first and second operations together according to an embodiment.

When the first signal 1 is identified in the first interface 110 while the first operation is being executed, the processor 140 may not execute the second operation thereafter, and receive a signal through the first interface 110. The processor 140 may deactivate (or disable) functions of the second interface 120 and may not receive (or may ignore) the second signal 2 transmitted by the second display apparatus. In other words, when the first signal 1 is identified in the first interface 110, the processor 140 may not receive the second signal 2 from the second interface 120 thereafter.

For example, when a clock signal is identified in the first signal 1 transmitted to the first interface 110 while the first operation is being executed, the processor 140 may not execute the second operation afterwards, and keep receiving a signal through the first interface 110. For this operation, the first operation may include a code for identifying the clock signal.

When the first signal 1 is not identified in the first interface 110 while the first operation is being executed, the processor 140 may not execute the first operation and execute the second operation. For example, the processor 140 may cease execution of the first operation and initiate the second operation when the first signal 1 is not identified in the first interface 110 while the first operation is executed.

When the second signal 2 is identified in the second interface 120 while the second operation is being executed, the processor 140 may not execute the first operation and continuously receive signals through the second interface 120. For example, the processor 140 may cease the repeated alternate execution of the first operation and the second operation, and continuously receive signals through the second interface 120 if the second signal 2 is identified in the second interface 120 while the second operation is being executed.

For example, when a clock signal is identified from the second signal 2 transmitted to the second interface 120 while the second operation is being executed, the processor 140 may not execute the first operation afterwards, and continuously receive signals through the second interface 120. For this operation, the second operation may include a code for identifying the clock signal. The processor 140 may deactivate (or disable) a function of the first interface 110 and may not receive the first signal 1 transmitted by the first display apparatus.

As such, the processor 140 may selectively receive one of the first signal 1 transmitted from the first external device 30-1 or the first display apparatus and the second signal 2 transmitted from the second external device 30-2 or the second display apparatus.

Deactivating one of the first and second interfaces based on whether the clock signal is identified is only an embodiment.

For example, the processor 140 may deactivate one of the first and second interfaces based on whether a sync signal and data enable signal are identified.

For example, when the sync signal and data enable signal are identified from the first signal 1 transmitted to the first interface 110 while the first operation is being executed, the processor 140 may not execute the second operation afterwards and continuously receive signals through the first interface 110.

In addition, when the sync signal and data enable signal are identified from the second signal 2 transmitted to the second interface 120 while the second operation is being executed, the processor 140 may not execute the first operation afterwards and continuously receive signals through the second interface 120. For this operation, the second operation may include a code for identifying the sync signal and the data enable signal.

The processor 140 may deactivate one of the first and second interfaces based on whether the clock signal is identified, or whether the sync signal and the data enable signal are identified. For example, when the clock signal or the sync signal and the data enable signal are identified from the first signal 1 transmitted to the first interface 110, the processor 140 may deactivate the function of the second interface 120, and when the clock signal is not identified from the first signal 1, and the sync signal and the data enable signal are not identified from the first signal 1, the processor 140 may execute the second operation based on the predetermined period.

The processor 140 may deactivate one of the first and second interfaces based on a lock or unlock of a phase locked loop (PLL). The PLL is configured to be locked or unlocked according to whether the clock signal is received, and may be included in the processor 140, and may be implemented in a separate configuration from the processor 140.

For this operation, the processor 140 may identify whether the PLL is locked or unlocked while executing the first operation. When the PLL is locked as the first signal 1 (e.g., a clock signal) is transmitted to the first interface 110, the processor 140 may identify that the first signal 1 is received at the first interface 110. In this case, the processor 140 may deactivate the function of the second interface 120 without executing the second operation.

When the first signal 1 is not transmitted to the first interface 110 during the predetermined period, the processor 140 may execute the second operation during the predetermined period to identify whether the PPL is locked or unlocked. In addition, when the PLL is unlocked as the second signal 2 (e.g., clock signal) is transmitted to the second interface 120, the processor 140 may identify that the second signal 2 is received at the second interface 120. In this case, the processor 140 may not execute the first operation and deactivate a function of the first interface 110.

Thereafter, the processor 140 may transmit signals to the outside through one of the third interface 111 and the fourth interface 121.

For example, when the first signal 1 is identified in the first interface 110 while executing the first operation, the processor 140 may transmit the first signal 1 received through the first interface to the second display apparatus through the fourth interface 121, and when the second signal 2 is identified in the second interface 120 while executing the second operation, the processor 140 may transmit the second signal 2 received through the second interface to the first display apparatus through the third interface 111.

In this method of transmitting and receiving signals, the plurality of display apparatuses constituting the modular display apparatus 1000 may receive one of the first signal and the second signal.

Figure 5:
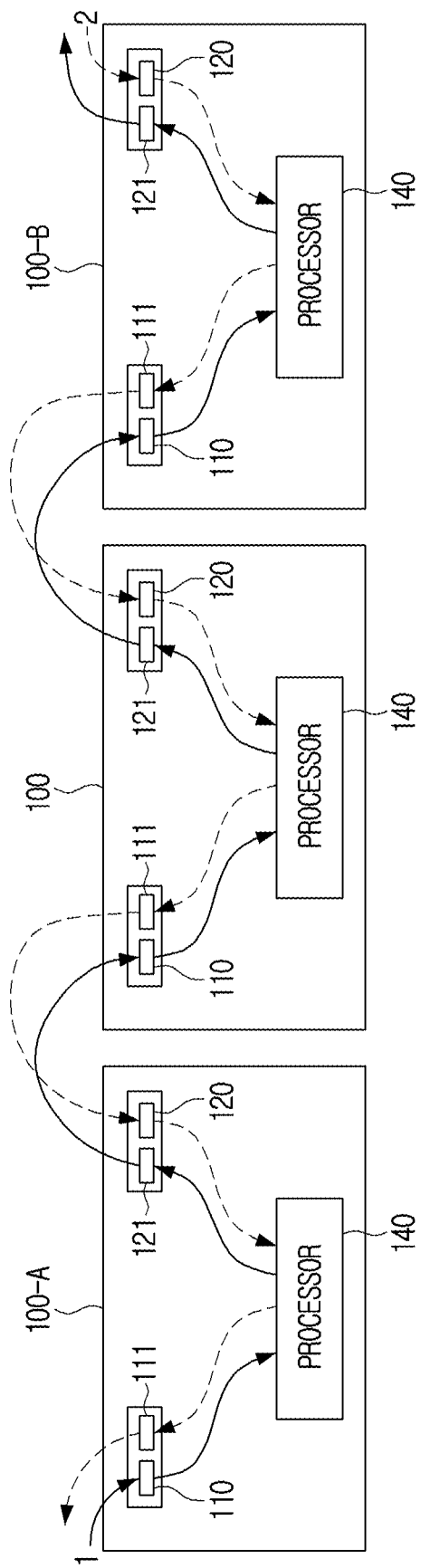
FIG. 5 is a view illustrating a plurality of display apparatuses according to an embodiment.

For example, as shown in FIG. 5, the modular display apparatus 1000 includes a display apparatus 100, a display apparatus A 100-A, and a display apparatus B 100-B, and the display apparatus A 100-A may receive the first signal 1 from the first external device 30-1 or the other display apparatus through the first interface 110, and the display apparatus B 100-B may receive the second signal from the second external device 30-2 or the other display apparatus through the second interface 120.

The display apparatus 100 may repeatedly execute the first operation and the second operation based on a predetermined period. When the first signal 1 is identified in the first interface 110 while executing the first operation, the display apparatus 100 may not execute the second operation afterwards, but continuously receive a signal through the first interface 110 and transmit the first signal 1 to the display apparatus B 100-B through the fourth interface 121. For example, the display apparatus 100 may cease the repeated alternate execution of the first operation and the second operation, and continuously receive signals through the first interface 110 if the first signal 1 is identified in the first interface 110 while the first operation is being executed.

In addition, the display apparatus 100 may not receive the second signal 2 transmitted by the display apparatus 100-B by deactivating the function of the second interface 120.

For example, in a state in which the display apparatus 100 has already received the first signal 1 including the same information as the second signal 2, the display apparatus 100 may display an image based on the first signal 1 and deactivate the function of the second interface 120. By deactivating a function of one of the first interface 110 and the second interface 120, the display apparatus may reduce processor overload and reduce a cross talk problem and an EMI occurrence problem that may be caused by the first signal 1 and the second signal 2.

When a signal is not identified in the first interface 110 during the predetermined period, the display apparatus 100 may execute the second operation, and when the second signal 2 is identified in the second interface 120 while executing the second operation, the display apparatus 100 may not execute the first operation and continuously receive the signal through the second interface 120 and transmit the second signal 2 to the display apparatus 100-A through the third interface 111. For example, the display apparatus 100 may cease the repeated alternate execution of the first operation and the second operation, and continuously receive signals through the second interface 120 if the second signal 2 is identified in the second interface 120 while the second operation is being executed.

In addition, the display apparatus 100 may not receive the first signal 1 transmitted by the display apparatus 100-A by deactivating the function of the first interface 110.

Figure 6:
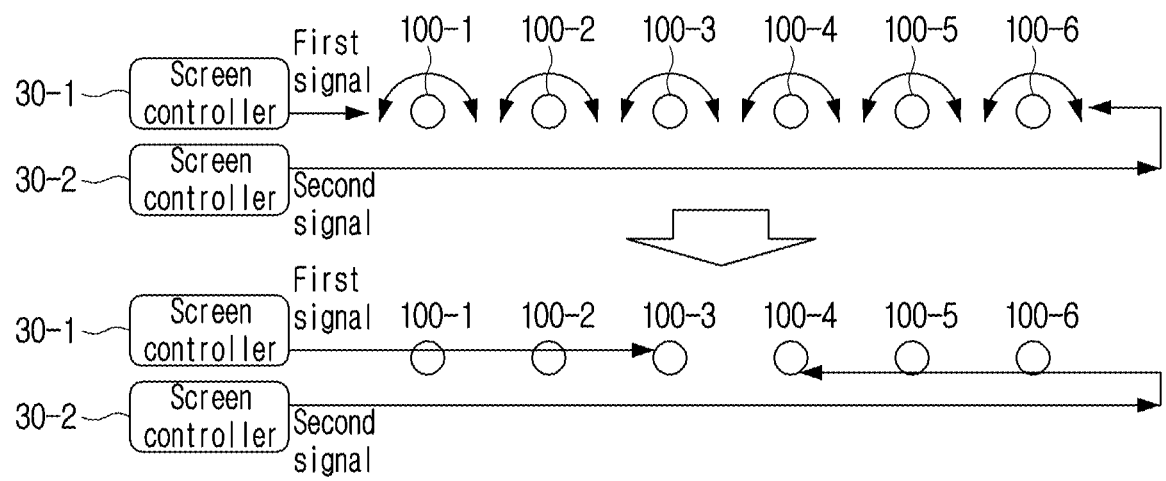
FIG. 6 is a view illustrating a method in which a display apparatus transmits and receives a signal according to an embodiment.

Based on the aforementioned description, the plurality of display apparatuses constituting the modular display apparatus 1000 may receive the first signal or the second signal as illustrated in FIG. 6.

FIG. 6 is a view illustrating a case in which the modular display apparatus 1000 is composed of first to sixth display apparatuses 100-1 to 100-6. Each of the first to sixth display apparatuses 100-1 to 100-6 may repeatedly execute the first and second operations until a signal is received through the first interface 110 or the second interface 120 based on a predetermined period.

While executing the first operation, the first display apparatus 100-1 may receive the first signal 1 from the first external device 30-1 through the first interface 110. The first signal 1 is an image signal including information on an image, and may refer to a main signal according to an embodiment. The first display apparatus 100-1 may transmit the first signal 1 to the second display apparatus 100-2 through the fourth interface 121.

When the first signal 1 is received from the first display apparatus 100-1 through the first interface 110 while executing the first operation, the second display apparatus 100-2 may transmit the first signal 1 to the third display apparatus 100-3 through the fourth interface 121.

When the first signal 1 is received through the first interface 110 from the second display apparatus 100-2 while executing the first operation, the third display apparatus 100-3 may transmit the first signal 1 to the fourth display apparatus 100-4 through the fourth interface 121.

The sixth display apparatus 100-6 may receive the second signal 2 from the second external device 30-2 through the second interface 120 while executing the second operation. The second signal 2 is an image signal including information on the same image as the image included in the first signal 1, and may refer to a backup signal according to an embodiment. The sixth display apparatus (100-6) may transmit the second signal 2 to the fifth display apparatus 100-5 through the third interface 111.

While executing the second operation, the fifth display apparatus 100-5 may receive the second signal 2 from the sixth display apparatus 100-6 through the second interface 120. The fifth display apparatus 100-5 may transmit the second signal to the fourth display apparatus 100-4 through the third interface 111.

While executing the second operation, the fourth display apparatus 100-5 may receive the second signal 2 from the fifth display apparatus 100-5 through the second interface 120. The fourth display apparatus 100-5 may transmit the second signal 2 to the third display apparatus 100-3 through the third interface 111.

Because the third display apparatus 100-3 has already received the first signal 1 including the same information as the second signal from the second display apparatus 100-2, the third display apparatus 100-3 may not receive the second signal 2 from the fourth display apparatus 100-4.

When the second signal 2 is received from the fourth display apparatus 100-4 before the third display apparatus 100-3 receives the first signal 1 from the second display apparatus 100-2, the third display apparatus 100-3 may receive the second signal through the second interface 120.

In this way, when the first signal 1 is transmitted to the first to third display apparatuses 100-1 to 100-3, and the second signal 2 is transmitted to the fourth to sixth display apparatuses 100-4 to 100-6, the first to third display apparatuses 100-1 to 100-3 may display an image based on the first signal 1, and the fourth to sixth display apparatuses 100-4 to 100-6 may display an image based on the second signal 2.

Figure 7:
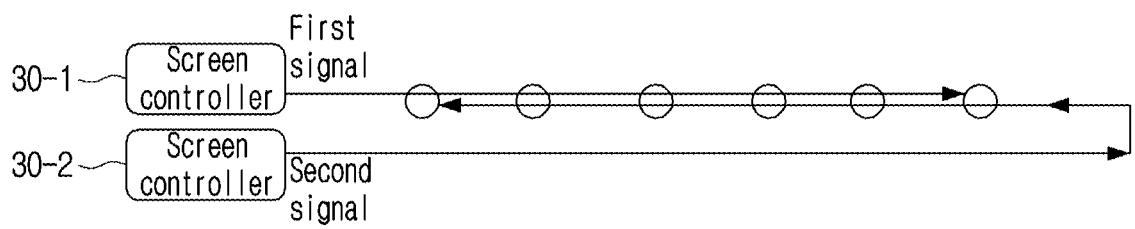
FIG. 7 is a view illustrating a method in which a display apparatus transmits and receives a signal.

FIG. 7 illustrates a contrasting example. A plurality of display apparatuses constituting a related modular display apparatus have received both a first signal from first external device 30-1 and a second signal from second external device 30-2. Because both the first signal and the second signal are received by each of the plurality of display apparatuses, the contrasting modular display apparatus generates excess heat in an interface, a processor is overloaded due to processing the plurality of signals, and also cross talk and EMI may be generated between the plurality of image signals.

By contrast, as illustrated in FIG. 6, each display apparatus 100 of the modular display apparatus 1000 may solve the aforementioned problem by selectively receiving one of the first signal and the second signal. In addition, when a signal is not transmitted to the third display apparatus 100-3 from the second display apparatus 100-2 due to a signal transmission error between the second display apparatus 100-2 and the third display apparatus 100-3, the third display apparatus 100-3 may receive a signal from the fourth display apparatus 100-4. In other words, the disclosure may execute a redundancy function while receiving one of the first signal and the second signal.

FIG. 8 is a flowchart illustrating a method of controlling a display apparatus according to an embodiment.

The display apparatus 100 may repeatedly execute the first operation for identifying a signal received through the first interface and the second operation for identifying a signal received through the second interface (S810).

For example, the display apparatus 100 may repeatedly execute the first operation and the second operation based on a predetermined period. In other words, the display apparatus 100 may execute the first operation during a first section based on the predetermined period, and may execute the second operation during a second section based on the predetermined period when a signal is not identified in the first interface during the first section, In addition, when the signal received through the first interface is identified while executing first operation, the display apparatus 100 may not execute the second operation after identifying the signal and display an image on the display based on the signal received through the first interface, and when a signal received through the second interface is identified while executing the second operation, the display apparatus 100 may not execute the first operation after identifying the signal and display an image on the display based on the signal received through the second interface (S820).

The identification of the signal may refer to an identification of a clock signal. For example, the display apparatus 100 may identify whether the clock signal is included in the signal received through the first interface while executing the first operation, and when it is identified that the clock signal is included in the signal, the display apparatus may display an image on the display based on the signal received through the first interface without executing the second operation. If it is identified that the clock signal is included in the signal, the display apparatus 100 may execute the second operation.

Alternatively, the display apparatus 100 may identify whether the signal includes a sync signal and a data enable signal, and when it is identified that the signal includes the sync signal and the data enable signal, the display apparatus 100 may not execute the second operation and display an image on the display based on the signal received through the first interface, and may execute the second operation when it is identified that the signal does not include at least one of the sync signal and the data enable signal.

When the signal received through the first interface is identified while the first operation is being executed, the display apparatus 100 may transmit the signal received through the first interface to the second display apparatus through the fourth interface, and deactivate the function of the second interface. When the signal received through the second interface is identified while the second operation is being executed, the display apparatus 100 may transmit the signal received through the second interface to the first display apparatus through the third interface to deactivate the function of the first interface.

Accordingly, the signal received through the first interface may be transmitted to the first plurality of display apparatuses among the plurality of display apparatuses constituting the modular display apparatus through a first path, and the signal received through the second interface may be transmitted to the second plurality of display apparatuses except for the first plurality of display apparatuses among the plurality of display apparatuses constituting the modular display apparatus through a second path.

According to various embodiments as described above, the disclosure can execute a redundancy function, reduce crosstalk occurring between a plurality of image signals, and reduce heat generated in an interface while receiving the plurality of image signals.

Further, the disclosure can reduce power consumption by receiving and processing one image signal among a plurality of image signals, and reduce electromagnetic interference (EMI) that may occur between the plurality of image signals.

The methods according to the above-described embodiments may be realized as software or applications that may be installed in the existing electronic apparatus.

Further, the methods according to the above-described embodiments may be realized by upgrading the software or hardware of the existing electronic apparatus.

The above-described embodiments may be executed through an embedded server in the electronic apparatus or through an external server outside the electronic apparatus.

A non-transitory computer readable medium in which a program is stored that, when executed, causes a device to sequentially execute a controlling method according to the disclosure may be provided.

The non-transitory computer readable recording medium refers to a medium that stores data and that can be read by devices. In detail, the above-described various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

Although embodiments have been disclosed, those skilled in the art will appreciate that various modifications, additions and substitutions are possible, without departing from the scope and spirit of the disclosure as disclosed in the accompanying claims. Accordingly, such modifications, additions and substitutions should also be understood to fall within the scope of the disclosure.

What is claimed is:

1. A display apparatus of a modular display apparatus, the display apparatus comprising:
at least one display module;
a first interface configured to receive a first signal from a first display apparatus;
a second interface configured to receive a second signal from a second display apparatus;
a third interface; and
a processor configured to:
repeatedly execute a first operation for identifying the first signal received through the first interface and a second operation for identifying the second signal received through the second interface,
based on the first signal being identified while executing the first operation, display an image on the at least one display module based on the first signal received through the first interface without executing the second operation, and
based on the second signal being identified while executing the second operation, display the image on the at least one display module based on the second signal received through the second interface and transmit the second signal to the first display apparatus through the third interface, without executing the first operation.

2. The display apparatus of claim 1, further comprising:
a fourth interface configured to transmit the first signal to the second display apparatus,
wherein the processor is further configured to:
based on the first signal received through the first interface being identified while executing the first operation, transmit the first signal received through the first interface to the second display apparatus through the fourth interface.

3. The display apparatus of claim 1, wherein the first signal received through the first interface and the second signal received through the second interface comprise information indicating a common image.

4. The display apparatus of claim 1, wherein the first signal received through the first interface is transmitted to a first plurality of display apparatuses among a plurality of display apparatuses constituting the modular display apparatus through a first path,
wherein the second signal received through the second interface is transmitted to a second plurality of display apparatuses among the plurality of display apparatuses constituting the modular display apparatus through a second path, and
wherein the first plurality of display apparatuses and the second plurality of display apparatuses do not comprise a common display apparatus.

5. The display apparatus of claim 1, wherein the processor is further configured to:
based on a phase locked loop (PLL) being locked as a clock signal is received by the first interface, display the image on the at least one display module based on the first signal received through the first interface without executing the second operation, and
based on the PLL not being locked as the clock signal is not received by the first interface, execute the second operation.

6. The display apparatus of claim 1, wherein the processor is further configured to:
identify whether a clock signal is included in the first signal received through the first interface while executing the first operation,
based on the clock signal being included in the first signal, display the image on the at least one display module based on the first signal received through the first interface without executing the second operation, and
based on the clock signal being not included in the first signal, execute the second operation.

7. The display apparatus of claim 1, wherein the processor is further configured to:
identify whether the first signal includes a sync signal and a data enable signal,
based on the sync signal and the data enable signal being identified in the first signal, display the image on the at least one display module based on the first signal received through the first interface without executing the second operation, and
based on either one or any combination of the sync signal and the data enable signal not being identified in the first signal, execute the second operation.

8. The display apparatus of claim 1, wherein the processor is further configured to not execute the second operation while executing the first operation, and to not execute the first operation while executing the second operation.

9. The display apparatus of claim 8, wherein the processor is further configured to execute the first operation during a first period, and based on the first signal not being identified in the first period, execute the second operation during a second period after the first period.

10. A method of controlling a display apparatus of a modular display apparatus, the method comprising:
repeatedly executing a first operation for identifying a first signal received through a first interface from a first display apparatus, and a second operation for identifying a second signal received through a second interface from a second display apparatus;
based on the first signal received through the first interface being identified while executing the first operation, displaying an image based on the first signal received through the first interface without executing the second operation; and
based on the second signal received through the second interface being identified while executing the second operation, displaying the image based on the second signal received through the second interface and transmitting the second signal received through the second interface to the first display apparatus through a third interface, without executing the first operation.

11. The method of claim 10, further comprising:
based on the first signal being received through the first interface while executing the first operation, transmitting the first signal received through the first interface to the second display apparatus through a fourth interface.

12. The method of claim 10, wherein the first signal received through the first interface and the second signal received through the second interface comprise information indicating a common image.

13. The method of claim 10, wherein the first signal received through the first interface is transmitted to a first plurality of display apparatuses among a plurality of display apparatuses constituting the modular display apparatus through a first path,
wherein the second signal received through the second interface is transmitted to a second plurality of display apparatuses among the plurality of display apparatuses constituting the modular display apparatus through a second path, and
wherein the first plurality of display apparatuses and the second plurality of display apparatuses do not comprise a common display apparatus.

14. The method of claim 10, further comprising:
based on a phase locked loop (PLL) being locked as a clock signal received by the first interface, displaying the image on the display apparatus based on the first signal received through the first interface without executing the second operation, and
based on the PLL not being locked as the clock signal is not received by the first interface, executing the second operation.

15. The method of claim 10, further comprising:
identifying whether a clock signal is included in the first signal received through the first interface while executing the first operation,
based on the clock signal being included in the first signal, displaying the image on the display apparatus based on the first signal received through the first interface without executing the second operation, and
based on the clock signal being not included in the first signal, executing the second operation.

16. The method of claim 10, further comprising:
identifying whether the first signal includes a sync signal and a data enable signal,
based on the sync signal and the data enable signal being identified in the first signal, displaying the image on the display apparatus based on the first signal received through the first interface without executing the second operation, and
based on any one or any combination of the sync signal and the data enable signal not being identified in the first signal, executing the second operation.

17. The method of claim 10, wherein the executing comprises not executing the second operation while executing the first operation, and not executing the first operation while executing the second operation.

18. The method of claim 17, wherein the executing comprises executing the first operation during a first period, and based on the first signal not being identified in the first period, executing the second operation during a second period after the first period.

19. A display apparatus comprising:
   at least one display module;
   a first interface;
   a second interface;
   a third interface; and
   a processor configured to:
      based on a first signal being received through the first interface, disable the second interface and control the at least one display module to display an image based on the first signal, and
      based on the first signal not being received through the first interface, disable the first interface, activate the second interface, control the at least one display module to display the image based on a second signal received through the second interface, and control the second signal to be transmitted through the third interface.

20. The display apparatus of claim 19, wherein the processor is further configured to repeatedly and alternately identify whether the first signal is received at the first interface and whether the second signal is received at the second interface until either the first signal is received at the first interface or the second signal is received at the second interface.

* * * * *